United States Patent Office 3,063,858
Patented Nov. 13, 1962

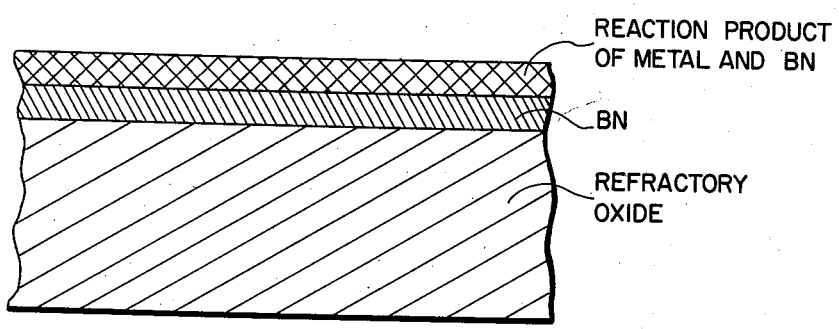

3,063,858
VAPOR SOURCE AND PROCESSES FOR VAPORIZING IRON, NICKEL AND COPPER
Robert W. Steeves, Nahant, Mass., assignor to National Research Corporation, Cambridge, Mass., a corporation of Massachusetts
Filed July 22, 1959, Ser. No. 828,701
5 Claims. (Cl. 117—5.1)

This invention relates to metals and more particularly to an evaporation source for nickel, copper and iron. This application is in part a continuation in part of my copending joint application Serial No. 786,675, filed January 14, 1959, now abandoned.

A principal object of the present invention is to provide a metal vapor source having a long source life at elevated temperatures.

Another object of the present invention is to provide a metal vapor source which is resistant to attack and splitting at elevated vaporization temperatures on the order of 2000° C.

Another object of the invention is to provide an improved method of handling such metal vapor source so as to furnish optimum source life.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application which will be defined in the claims.

For a fuller understanding of the nature and objects of the invention, reference should be had to the following detailed description taken in connection with the accompanying drawing which is a diagrammatic, fractional, sectional view of one preferred form of the invention.

In the vaporization of metals in a vacuum chamber, one of the principal problems of the prior art has been that of providing a suitable source for the metal vapors. At elevated temperatures, metal attack on refractory metal oxide crucibles such as zirconia, magnesia and Alundum results in crucible decomposition and splitting. Such decomposition of the crucible results in contamination of the melt with attendant increase of the melting point and decrease of the vapor pressure of the metal.

Evaporation of nickel from zirconia crucibles for example can be carried out at slow evaporation rates for approximately 2 hours without appreciable attack. However, when evaporation rates are increased above the minimum conditions for evaporation the zirconia crucible decomposes and the melt becomes severely contaminated. Similar failures occur when evaporation of copper and iron is attempted.

I have discovered that, when a boron nitride surface is applied to a refractory metal oxide crucible, there is furnished excellent means for supporting the molten metals nickel, copper and iron while they are heated to their evaporation temperatures. The boron nitride coating need not be thicker than a fraction of an inch although it can be made much thicker.

The boron nitride coating is preferably prepared in the following manner. A slurry is prepared by mixing 5 grams of powdered boron nitride with a few drops of ethyl silicate to which one drop of a commercial wetting agent has been added. Enough water is then added to form a thick paste. The paste is preferably applied to the interior surface and upper edge of the refractory oxide crucible. The coating is allowed to air dry at 200° F. and is then fired in a vacuum oven at 1300° C. until gas evolution is completed. The thus coated crucible, when used as a source of the metal vapors at elevated temperatures, demonstrates excellent resistance to attack by the molten metals.

The invention will now be described by way of example.

Example 1

A boron nitride coating was applied to a zirconia crucible in the manner described above. The crucible had a 2½ inch O.D., 2¼ I.D., and was 3 inches high. The crucible was placed inside an induction coil connected to a 9600 c.p.s. generator, a sleeve of magnesium oxide being placed between the induction coil and the outside of the crucible. The crucible which contained a solid charge of nickel and the coil assembly were mounted in a vacuum chamber, which was then pumped down to a pressure of 1 micron Hg abs. Argon was then admitted to provide a pressure of between about 150 and 200 microns. After the power was turned on, and during the initial heating of the nickel, there was no coupling to the crucible, and only the nickel became heated. As its temperature was raised, it became molten and it formed an upright mass which was confined by the electromagnetic field. The nickel was heated to a high temperature on the order of 1700° C. and gradually heated the crucible by radiation. The nickel soon started to wet the bottom inner surface of the crucible and subsequently the whole inner and top surfaces. As the nickel wet the crucible, the wet surface became conductive and was heated to the same temperature as the nickel by induction. At this point, the nickel was only slightly affected by the electromagnetic field. This wetting of the crucible took approximately ½ hour. Evaporation of nickel at the rate of 2 ounces per hour was maintained for over four hours without crucible attack. The power was then turned off. The vacuum tank was opened, while the nickel in the crucible was still molten, and the molten nickel was dumped out of the crucible to prevent its freezing within the crucible with the danger of cracking the crucible. The crucible was then replaced in the induction coil and evaporation of nickel was carried out for an additional four hours without crucible attack.

Although the foregoing example is directed to nickel, both the copper and iron can be vaporized in the same manner without decomposition or cracking of the boron nitride coated zirconia crucible.

Similarly, evaporation of metals can be carried out in other boron nitride coated refractory oxide crucibles such as magnesia and Alundum, the principal requirement of the refractory oxide base being that it be capable of withstanding elevated temperatures on the order of 2000° C. and that it have a vapor pressure less than the metal to be vaporized.

While boron nitride is theoretically an excellent insulator, even at elevated temperatures, it has been found that, when the surface has been treated so as to be wet by and therefore reacted with the molten metals (the crucible having the structure shown in the drawing), the inner surface of the crucible becomes conductive. Accordingly, it makes an excellent induction-heated source of the metal vapors. The fact that the wetted surface of the crucible becomes conductive permits a large mass of molten metal to be maintained in the crucible even though some induction currents are created in the molten metal. In a nonwetted crucible of zirconia, for example, it is impossible to maintain a full charge in a crucible since the induction field will literally throw the molten metal out of the crucible. With a boron nitride coated refractory oxide crucible, wetted by the molten metal, there is sufficient coupling to the crucible so that a completely full crucible may be maintained.

Since certain changes may be made in the above process and product without departing from the scope of the invention herein involved, it is intended that all matter contained in the above description shall be interpreted as illustrative and not in a limiting sense.

What is claimed is:

1. A refractory oxide crucible having a boron nitride surface and capable of being inductively heated by an electro-magnetic field to a temperature sufficiently high to permit vaporization of a metal selected from the group consisting of nickel, copper and iron, said crucible being substantially completely resistant to attack by said molten metals, the surface of the boron nitride consisting essentially of the reaction product of said metal and boron nitride.

2. In a process for the vaporization of metals in vacuum wherein a metal selected from the group consisting of nickel, copper and iron is heated to a temperature sufficiently above its melting point to evaporate the metal, the improvement which comprises supporting the molten metal while the metal is heated to its vaporization temperature in a refractory oxide crucible having a surface of boron nitride, the surface of the boron nitride consisting essentially of the reaction product of said metal and boron nitride.

3. In a process for vaporization of metals in vacuum wherein a metal selected from the group consisting of nickel, copper and iron is heated to a temperature sufficiently above its melting point to evaporate the metal, the improvement which comprises supporting the molten metal, while the metal is heated to its evaporation temperatures, in a refractory oxide crucible having at least an inner surface of boron nitride in position to contact the molten metal during evaporation, the surface of the boron nitride consisting essentially of the reaction product of said metal and boron nitride.

4. In a process for vaporization of metals in vacuum wherein a metal selected from the group consisting of nickel, copper and iron is heated to a temperature sufficiently above its melting point to evaporate the metal, the improvement which comprises supporting the molten metal, while the metal is heated to its evaporation temperature in a refractory oxide crucible having at least an inner surface of boron nitride in position to contact the molten metal during evaporation, the surface of the boron nitride consisting essentially of the reaction product of said metal and boron nitride, and substantially completely emptying the crucible of its charge of molten metal prior to cooling the crucible to a temperature below the freezing point of the molten metal.

5. The process of claim 4 wherein the molten metal is emptied by evaporating the crucible to dryness.

References Cited in the file of this patent

UNITED STATES PATENTS

| | | |
|---|---|---|
| 1,063,483 | Weintraub | June 3, 1913 |
| 1,570,802 | Bichowsky | Jan. 26, 1926 |
| 1,862,191 | Meth | June 7, 1932 |
| 2,201,049 | Moore | May 14, 1940 |
| 2,387,970 | Alexander | Oct. 30, 1945 |
| 2,665,223 | Clough et al. | Jan. 5, 1954 |
| 2,693,521 | Alexander | Nov. 2, 1954 |
| 2,726,160 | Ueltz | Dec. 6, 1955 |

FOREIGN PATENTS

| | | |
|---|---|---|
| 731,990 | Great Britain | June 15, 1955 |

OTHER REFERENCES

"Vapor-Plating" (Powell et al.), published by John Wiley and Sons, Inc. (New York), 1955; page 101 relied upon.